No. 743,704. PATENTED NOV. 10, 1903.
J. D. FLYNN.
HEAD STALL FOR HORSES.
APPLICATION FILED AUG. 30, 1902.
NO MODEL.
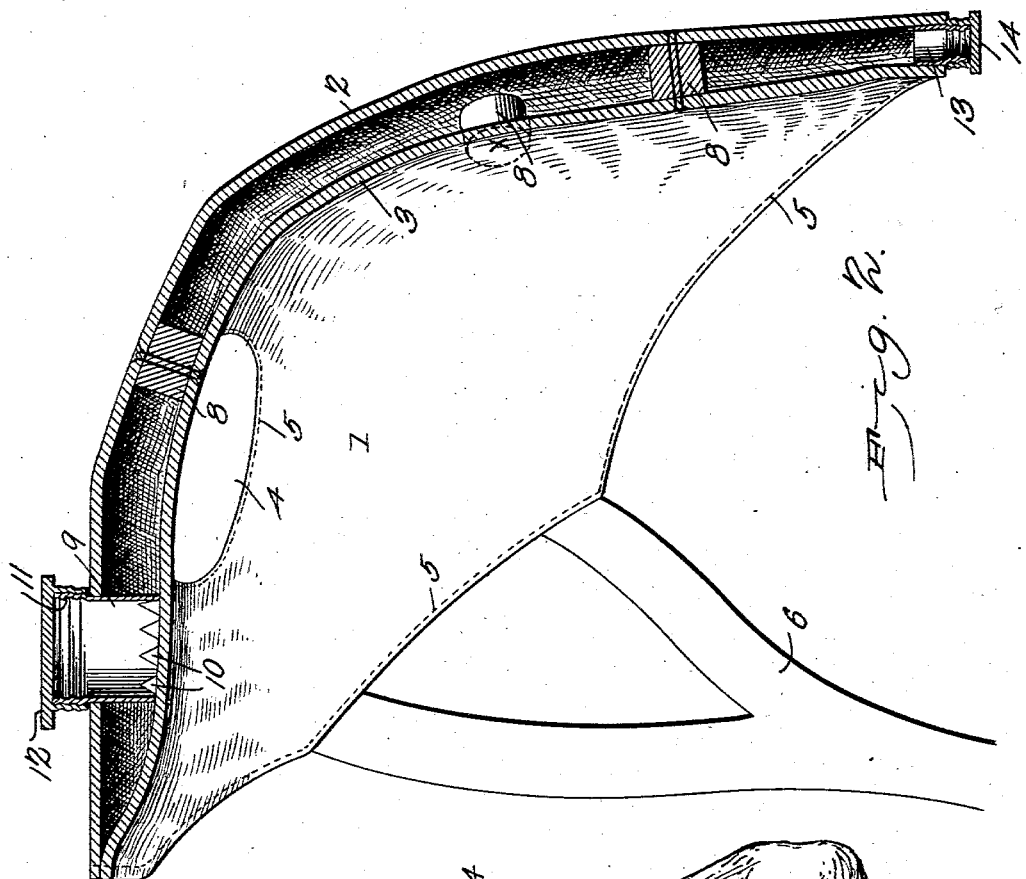
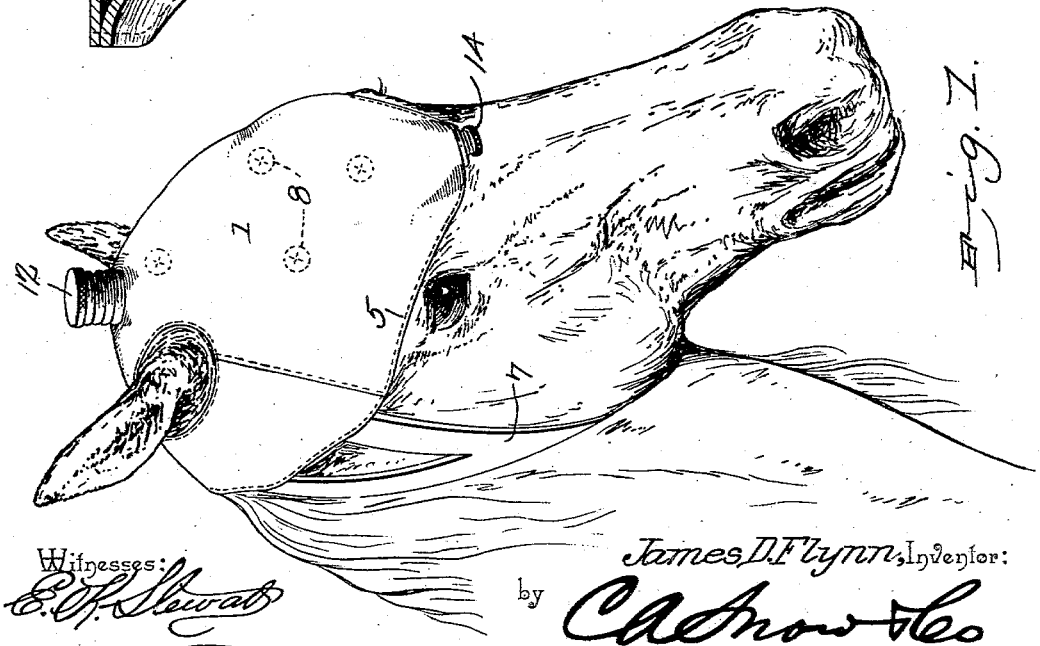
James D. Flynn, Inventor:
by C. A. Snow & Co.
Attorneys.
Witnesses:

No. 743,704. Patented November 10, 1903.

UNITED STATES PATENT OFFICE.

JAMES D. FLYNN, OF WASHINGTON, DISTRICT OF COLUMBIA.

HEAD-STALL FOR HORSES.

SPECIFICATION forming part of Letters Patent No. 743,704, dated November 10, 1903.

Application filed August 30, 1902. Serial No. 121,644. (No model.)

*To all whom it may concern:*

Be it known that I, JAMES D. FLYNN, a citizen of the United States, residing at Washington, in the District of Columbia, have invented a new and useful Head-Stall for Horses, of which the following is a specification.

This invention relates to a head-shield for horses.

The object of the invention is in a simple, ready, thoroughly efficient, and practical manner to protect horses from sunstroke or from being overcome by excessive heat.

With these and other objects in view, as will appear as the nature of the invention is better understood, the same consists, generally stated, in a double-walled shield with the walls thereof held spaced apart and being of a shape to conform closely to the crown, sides, and forehead of an animal's head.

The invention consists, further, in a shield adapted to hold water and provided with means for filling and emptying it without removing it from the animal's head.

The invention consists, further, in a shield to contain water, the plies or walls of the shield being held spaced apart to prevent distortion or bulging when filled and to prevent the collapse thereof when the water is removed, and being provided, further, with means for filling or emptying it without removing it from the animal's head.

The invention consists, further, in the novel construction and combination of parts of a head-shield for horses, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in perspective, exhibiting the shield positioned upon a horse's head. Fig. 2 is a view in vertical longitudinal section through the shield.

Referring to the drawings, 1 designates the shield, the same being constructed of two plies 2 and 3 of any suitable waterproof material, such as rubber, which are molded or otherwise shaped to conform to the crown, sides, and forehead of a horse's head. The shield is provided with two openings 4, through which the animal's ears protrude, and the edges of these openings, as well as the sides and front of the hood, are suitably connected, as by being vulcanized together or assembled by stitches 5, as may be preferred. The sides of the shield have associated with them fastening-strips 6 and 7, the terminals of the straps that are connected with the shield being forked, thus to distribute the strain on the shield when the same is positioned on the animal's head, the free terminal of one strap being provided with a buckle and the like terminal of the other strap with a plurality of openings to be engaged by the tongue of the buckle, and as this construction is common and well understood detailed illustration is omitted.

In order to hold the plies or walls of the hood spaced at the proper distance apart, thus to prevent bulging or distortion of the structure when filled with water and to prevent its collapse when empty, suitable spacing means, such as blocks or buttons 8, are employed, with which the plies are suitably secured, as by means of stitches or rivets. As herein shown these spacing devices are disposed at the front portion of the shield; but it is to be understood that they may be employed in connection with the rear and side portions thereof if found necessary or desirable.

Secured to the ply or wall 2 at the crown of the shield is a metallic filling-tube 9, which operates to hold the plies at this point separated in the same manner as the spacing devices 8, the end of the tube that impinges the ply 2 being provided with scallops or serrations 10 to permit escape of water into the space between the plies. The tube projects upward beyond the ply 2 and is threaded at 11 for engagement with a screw-cap 12, by which it is closed when the shield is once filled. At the center of the front portion of the shield there is arranged a discharge-tube 13, the outer end of which is threaded for the reception of a screw-cap 14, which operates normally to seal the tube.

In applying the shield to position it is first emptied of water in order that it may more closely conform to the contour of the animal's head and is then secured in position by means of the straps 6 and 7. When thus positioned, the screw-cap 12 is removed and water in the desired quantity or any other suitable fluid is supplied to the interior of the shield, after which the cap is again replaced. So long as the water remains cool, and even after it has become slightly warm, it will operate in a positive manner to protect the animal's head from the effect of the sun's rays, and when the shield is used with air as a filling it serves as a non-conductor for the sun's rays in the same manner as an attic over a building. If the animal be exposed for long stretches of time to excessive heat, so that the water becomes heated, and thus uncomfortable to its head, cool water may be readily supplied by removing the screw-cap 14 to permit discharge of the contents, then replacing the cap, and then removing the cap 12 and filling, as before. The spacing-blocks hence perform the double function of preventing an abnormal distention or collapse of the walls of the shield.

The embodiment of the invention herein shown is illustrative of one form that will be thoroughly efficient in use; but it is to be understood that the invention is not to be limited to the precise proportion and shape of the parts herein shown, as these may be widely departed from and still be within the scope of the invention.

Having thus fully described my invention, what I claim as new, and desire to secure by Letters Patent, is—

1. A device of the class described comprising a multi-ply shield, and means connected with and disposed between the oppositely-disposed plies for performing the double function of a holder for retaining said plies in position against abnormal distention when filled and of spacing-blocks for preventing their collapse when empty.

2. A device of the class described, comprising a multi-ply shield, spacing-blocks connecting the plies thereof, and a filling and an emptying device carried by the shield, the filling device constituting also a means for holding the plies spaced.

3. A device of the class described, comprising a multi-ply shield, spacing-blocks connecting the plies thereof, a filling device carried by the upper portion of the shield and having its inner end provided with water-escape openings, and an emptying device carried by the lower portion of the shield.

4. A device of the class described comprising a multi-ply shield, spacing-blocks disposed at intervals between the plies of said shield, and fastening means passed through said plies and blocks to hold the latter against displacement.

In testimony that I claim the foregoing as my own I have hereto affixed my signature in the presence of two witnesses.

JAMES D. FLYNN.

Witnesses:
W. J. DILLON,
J. H. JOCHUM, Jr.